(12) United States Patent
Morita

(10) Patent No.: US 7,299,932 B2
(45) Date of Patent: Nov. 27, 2007

(54) OIL FILTER

(75) Inventor: Shoji Morita, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/678,898

(22) Filed: Feb. 26, 2007

(65) Prior Publication Data

US 2007/0131608 A1 Jun. 14, 2007

Related U.S. Application Data

(63) Continuation of application No. 10/618,584, filed on Jul. 15, 2003.

(30) Foreign Application Priority Data

Aug. 9, 2002 (JP) .............................. 2002-232250

(51) Int. Cl.
*B01D 35/30* (2006.01)
*B01D 35/153* (2006.01)
(52) U.S. Cl. ..................... 210/443; 184/6.24; 210/136; 210/232; 210/450
(58) Field of Classification Search ........ 210/232–238, 210/440, 443, 444, 450, 453, 454, 398
See application file for complete search history.

(56) References Cited

U.S. PATENT DOCUMENTS 2,032,828 A * 3/1936 Attwood ..................... 210/301
2,540,134 A 2/1951 Nelson
3,727,764 A 4/1973 Ogden
5,066,391 A 11/1991 Faria
5,525,225 A 6/1996 Janik et al.
5,584,987 A 12/1996 Mules
5,698,098 A 12/1997 Ernst et al.
5,711,872 A 1/1998 Jones et al.
5,902,479 A 5/1999 Fukumori et al.
6,685,829 B1 2/2004 Baumann et al.

FOREIGN PATENT DOCUMENTS

DE 22 57 077 A 5/1973
GB 944639 12/1963
JP 10-146503 6/1998

OTHER PUBLICATIONS

Shoji Morita, U.S.P.T.O. Notice of Allowance, U.S. Appl. No. 10/618,584, Feb. 20, 2007, 8 pages.

* cited by examiner

*Primary Examiner*—Joseph Drodge
(74) *Attorney, Agent, or Firm*—Foley & Lardner LLP

(57) ABSTRACT

An oil filter is provided which comprises a housing main body, a cover attached to the housing main body on the lower side thereof, an inner tubular member axially movably disposed in a recessed portion of the housing main body, a seal member interposed between the inner tubular member and the cover so as to provide a seal therebetween, a biasing unit for urging the inner tubular member in the direction to protrude from the recessed portion, and a filter element disposed in an oil flowing space between the housing main body and the cover, wherein when the cover is in a sate of being attached to the housing main body, the inner tubular member is pushed down into the recessed portion of the cover against a bias of the biasing unit.

8 Claims, 10 Drawing Sheets

OIL FILTER

CROSS-REFERENCE TO RELATED APPLICATIONS

The present application is a continuation of U.S. application Ser. No. 10/618,584, filed Jul. 15, 2003, the entire contents of which are incorporated herein by reference.

BACKGROUND OF THE INVENTION

The present invention relates to an oil filter for use in an internal combustion engine for removing foreign matters contained in lubricating oil, particularly of the kind having a filter element that can be removed from a housing and replaced as a unit for maintaining the oil filter against clogging or the like.

An oil filter of this kind is disclosed in Japanese Unexamined Patent Publication No. 10-146503.

The oil filter includes a filter housing consisting of a housing main body having an oil inlet passage and an oil outlet passage and a cover detachably attached to an opening portion of the housing main body. At an oil flowing space within the filter housing is disposed a filter element. At the time of replacement of the filter element in such an oil filter, the cover is first removed from the housing main body, then the oil remaining within the housing main body is drained or discarded and thereafter the filter element is removed from the filter main body.

SUMMARY OF THE INVENTION

However, in such an oil filter, oil remains within the housing main body at the time of replacement of the filter element and the remaining oil tends to be splashed or scattered to the outside at the time of removal of the cover from the housing main body, thus causing an anxiety or fear that the surrounding place or area is made dirty by the splashed or scattered oil.

It is accordingly an object of the present invention to provide an oil filter that enables a filter element to be replaced readily and assuredly without causing oil remaining within a housing main body to be splashed or scattered to the outside at the time of replacement of the filter element.

To achieve the above object, there is provided according to an aspect of the present invention an oil filter comprising a housing main body having an oil inlet passage and an outlet passage, a cover detachably attached to the housing main body on a vertically lower side thereof and having a recessed portion that opens toward a housing main body side, an inner tubular member disposed in the recessed portion of the cover so as to be movable into and out of the recessed portion, a seal member interposed between the inner tubular member and the cover so as to provide a seal therebetween, a biasing unit for urging the inner tubular member in the direction to protrude from the recessed portion of the cover, and a filter element disposed in an oil flowing space defined between the housing main body and the cover for filtrating oil introduced thereinto, wherein when the cover is in a sate of being attached to the housing main body, the inner tubular member is pushed down into the recessed portion of the cover against a bias of the biasing unit.

According to another aspect of the present invention, there is provided an oil filter comprising a housing main body having an inlet passage and an outlet passage, a cover detachably attached to the housing main body and having a recessed portion that opens toward a housing main body side, a partition member disposed in the recessed portion of the cover so as to be movable into and out of the recessed portion and partitioning a space between the cover and the housing main body into a filter chamber on a housing main body side and an oil suction chamber on a bottom side of the cover, a seal member interposed between the partition member and the cover to provide a seal therebetween, a biasing unit for urging the partition member in the direction to increase the volume of the oil suction chamber, a filter element disposed in the filter chamber for filtrating oil introduced thereinto, and a communication passage for providing communication between the oil suction chamber and the oil filter chamber, wherein when the cover is attached to the housing main body, the partition member is pushed down into the recessed portion of the cover against the bias of the biasing unit.

DESCRIPTION OF THE PREFERRED EMBODIMENTS

Figure 1:
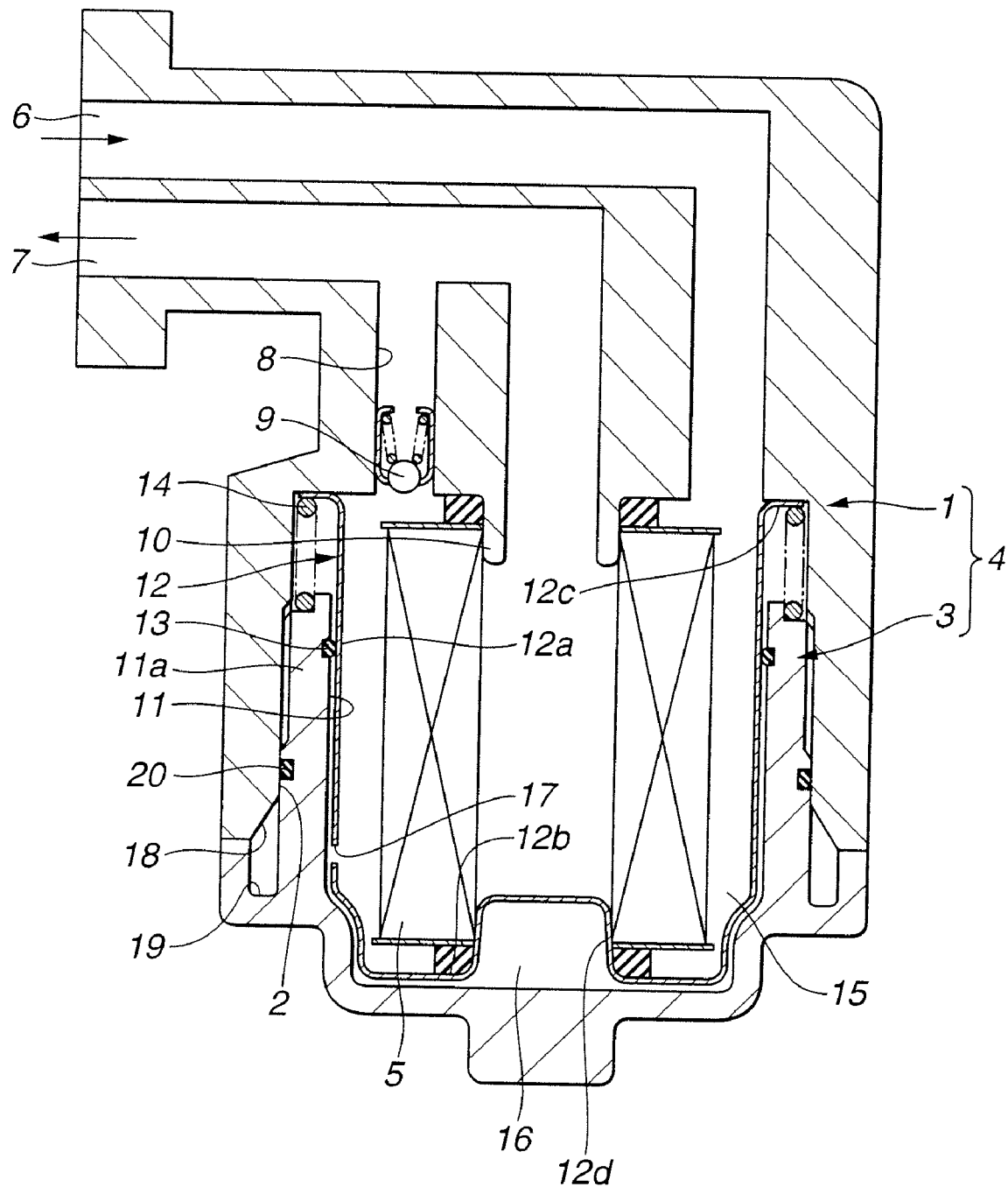
FIG. 1 is a sectional view of an oil filter according to a first embodiment of the present invention.
Figure 3:
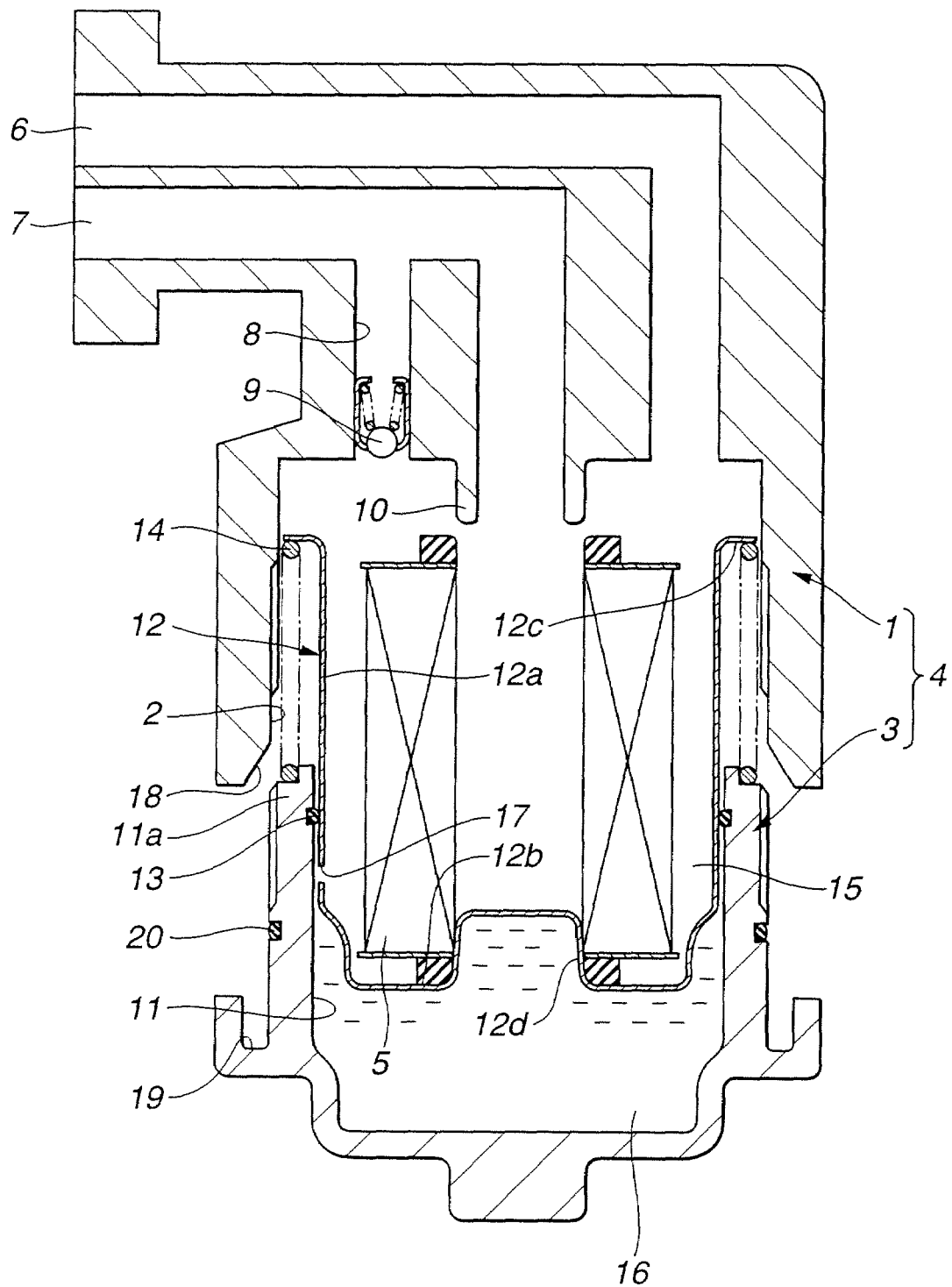

Referring first to FIGS. 1 and 3, an oil filter according to a first embodiment of the present invention includes a filter housing 4 made up of a housing main body 1 that is fixed to an internal combustion engine (not shown) or the like and a cover 3 that is threadedly engaged with an inner circumferential surface of an opening portion 2 of the housing main body 1. The opening portion 2 extends axially vertically and opens vertically downward. Within the filter housing (i.e., in the oil flowing space) is disposed a cylindrical filter element 5. In this embodiment, attachment or removal of the cover 3 to and from the housing main body 1 is performed on the vertically lower side of the housing main body 1.

The housing main body 1 has at a bottom wall (upper wall in FIG. 1) an inlet passage 6 for drawing lubricating oil returned from the internal combustion engine to an outer circumferential side of the filter element 5, an outlet passage 7 for supplying lubricating oil having passed the filter element 5 from a circumferentially inner portion of the filter element 5 to various portions of the internal combustion engine, and a bypass passage 8 for bypassing the filter element 5 and drawing lubricating oil to the outlet passage 7 side when the pressure inside the inlet passage 6 side becomes equal to or higher than a predetermined value. In the meantime, indicated by 9 is a check valve disposed in the bypass passage 8 and by 10 is a boss portion provided to a central bottom surface portion of the housing 1, on which boss portion 10 is fitted an upper end inner circumferential potion of the filter element 5.

The cover 3 includes a recessed portion 11 that opens to the housing main body 1 side. The recessed portion 11 is threadedly engaged at an outer surface of a circumferential wall 11a thereof to an inner surface of the opening portion 2 of the housing main body 1. Inside the recessed portion 11 is disposed a thin-walled inner tubular member 12 in a way as to be axially movable into and out of the recessed portion 11.

The inner tubular member 12 is formed into a bottomed, nearly hollow cylindrical shape and has a tubular wall 12a fitted in the circumferential wall 11 of the cover 3 so as to be slidable therewithin, a partition wall 12b provided to the lower end of the tubular wall 12a so as to be integral with the same and a radially outward flange 12c provided to the upper end portion of the tubular wall 12a so as to be opposed to the outer circumferential end surface of the recessed portion 11 of the cover 3. To the inner circumferential surface of the recessed potion 11 of the cover 3 is attached a seal member 13 such as an O-ring that fittingly contacts the tubular wall 12a of the inner tubular member 12. The seal member 13 provides a seal between the cover 3 and the inner tubular member 11. Further, between the end surface of the recessed portion 11 of the cover 3 and the radially outward flange 12c of the inner tubular member 12 is disposed a coil spring 14 that serves as a biasing means or unit. By the coil spring 14, the inner tubular member 12 is urged in the direction to protrude from the recessed portion 11 of the cover 3.

Further, the partition wall 12b of the inner tubular member 12 defines a first oil collecting space 15 positioned on the upper side and a second oil collecting space 16 positioned on the lower side. However, the oil collecting spaces 15, 16 are communicated with each other through a plurality of communication holes 17 (though only one is shown) formed in the tubular wall 12a. The total opening area of the communication holes 17 is set sufficiently large so that oil can flow, by its gravity, freely inside the both oil collecting spaces 15, 16 through the communication holes 17. At least one of the communication holes 17 is positioned adjacent the vertically lowermost position of the inner tubular member 12 when the cover 3 is turned upside down together with the inner tubular member 12. In the meantime, the total volume of the first and second oil collecting spaces 15, 16 when the inner tubular member 12 protrudes maximumly from the recessed portion 11 of the cover 3 is set larger than the volume of oil remaining inside the filter housing 4.

Further, at the central portion of the partition wall 12b is provided an upward boss 12d. On the boss 12d is fitted a lower end inner circumferential portion of the filter element 5. In the meantime, by making fitting engagement of the boss 12d and the filter member 5 be more tight than that of the housing main body 1 side and the boss 10, the filter element 5 can be removed together with the cover 3 upon removal of the cover 3 from the housing main body 1.

Further, to the end of the opening portion 2 of the housing main body 1 is provided a tapered portion 18 that tapers upward. In contrast to this, provided to a bottom side outer peripheral portion of the cover 3 so as to be associated with the tapered portion 18 is an annular recess 19 that serves as an oil collecting portion. In the meantime, indicated by 20 is a seal member that is attached to the outer circumferential wall 11a of the cover 3 at a location more downward of a threaded joining portion at which it is joined with the housing main body 1 and that provides a seal between the housing main body 1 and the cover 3.

Upon normal use, the oil filter is in the state shown in FIG. 1. Namely, the filter 5 is engaged with the boss 12d of the inner tubular member 12 and the boss 10 of the housing main body 10. Under this condition, the cover 3 is threadedly engaged with the opening portion 2 of the housing main body 1. The inner tubular member 2 is abuttingly engaged at the radially outward flange 12c with the housing main body 1. Threaded engagement of the cover 3 with the housing main body 1 causes the coil spring 14 to be held compressed. Accordingly, in a state of the cover 3 being threadedly engaged with the housing main body 1, the inner tubular member 12 is pushed down into the recessed portion 11 of the cover 3 against the biasing force of the coil spring 14.

Figure 2:
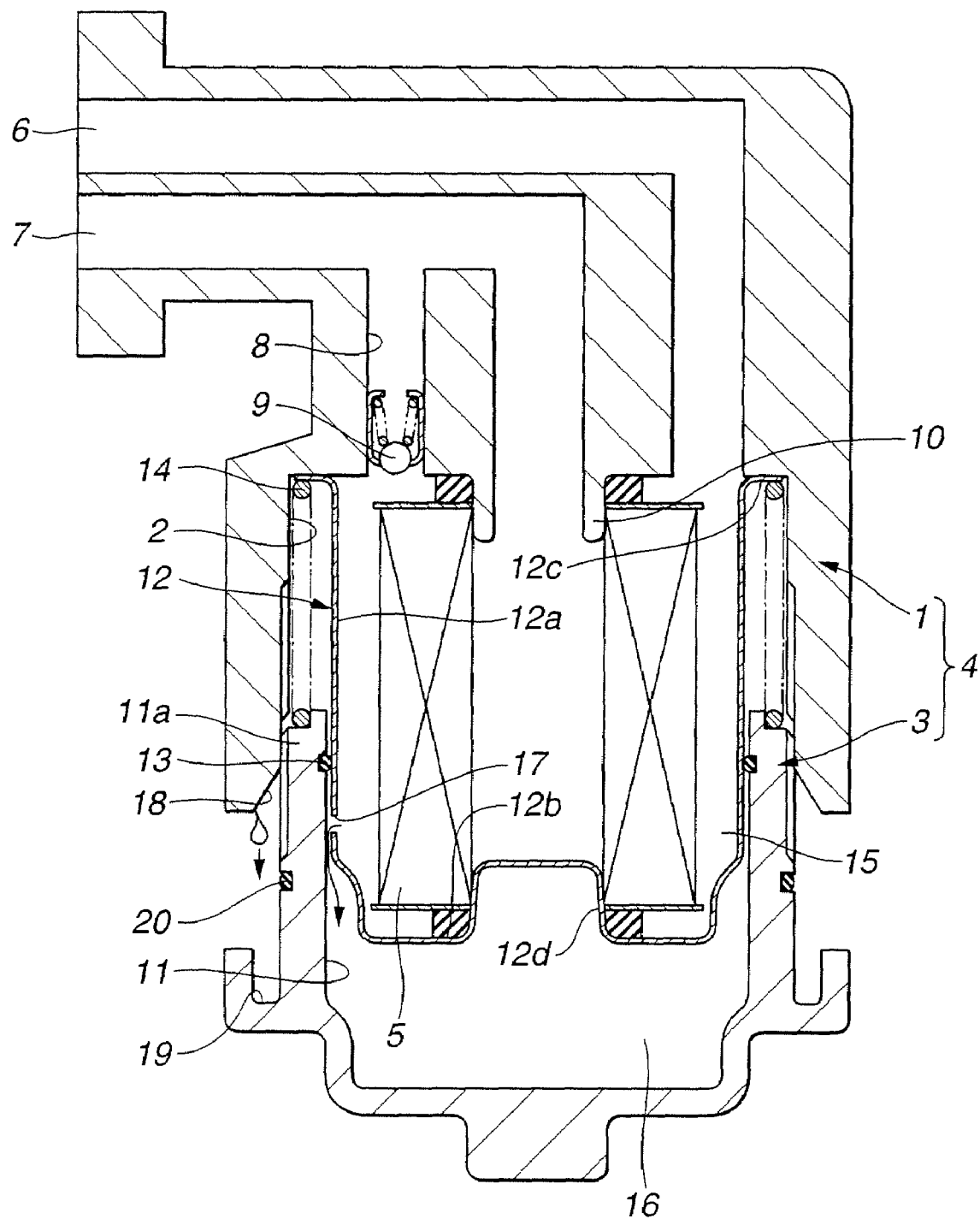
FIGS. 2 and 3 are sectional views of the oil filter of FIG. 1, in the states of a cover being partly removed.

To replace the filter element 5 from this condition, the cover 3 is loosened little by little by using a jig or the like and is moved gradually downward of the housing main body 1 as shown in sequence in FIGS. 1 and 2. By this, the coil spring 14 becomes longer while holding the radially outward flange 12c of the inner tubular member 12 to be pressed against the bottom surface of the housing main body 1, thus allowing the inner tubular member 12 to move gradually upward relative to the recessed portion 11 of the cover 3, i.e., move gradually out of the same. Accordingly, at this time, the volume of the second oil collecting space 16 under the inner tubular member 12 increases gradually, thus increasing the total volume of the first and second oil collecting spaces 15, 16.

At this time, downward movement of the cover 3 causes oil remaining inside the filter housing 4 to flow through the communication holes 17 into the second oil collecting space 16. Thus, as shown in FIG. 3, when the cover 3 is removed completely from the housing main body 1, almost all of the remaining oil is collected inside the oil collecting spaces 15, 16. Further, during the above-described removal of the cover 3 from the housing main body 1, a portion of the remaining oil flows downward along the inner surface of the opening portion 2 of the housing main body 1 and the circumferential wall 11a of the cover 3. However, such oil flowing downward is collected by the annular recess 19 at the outer circumferential periphery of the cover 3 and is prevented from being scattered to the outside.

After the cover 3 is removed in the above-described manner, the cover 3 is held above a predetermined oil recovery vessel and turned upside down to throw or discard the oil inside the first and second oil collecting spaces 15, 16 into the oil recovery vessel. At this time, since the inner tubular member 12 has the communication hole 17 adjacent the lowest position thereof, the oil inside the both oil collecting spaces 15, 16 can be drained or discharged to the outside almost completely. Thereafter, the filter element 5 is pulled out of the boss 12d of the inner tubular member 12 and is replaced by new one.

Accordingly, the oil filter of this embodiment is constructed so that upon removal of the cover 3 the inner tubular member 12 is caused to move out of the cover 3 to increase the total volume of the oil collecting spaces 15, 16 of the cover 3 side, thus making it possible to discard the remaining oil into the oil recovery vessel easily without causing the remaining oil to be scattered to the outside.

In the meantime, attachment of the cover 3 to the housing main body 1 can be attained by any means other than a thread fastening means so long as it can attain detachable attachment. However, in case the thread fastening is employed as in this embodiment, springback of the return spring can be controlled gradually and therefore there can be attained such an advantage that scattering of oil due to rapid springback of the return spring 14 can be prevented.

Further, it will do not to provide the inner tubular member 12 with the partition wall 12*b*. However, in case the partition wall 12*b* is provided as in this embodiment, it becomes possible to control flow of oil once collected on the cover 3 side by means of the partition wall 12*b* and prevent scattering of oil upon removal of the cover 3 assuredly. Further, by setting the volume of the second oil collecting space 16 so as to allow the remaining oil to be positioned lower than the partition wall 12*b*, scattering of oil due to disturbance of the liquid surface can be prevented assuredly.

Figure 4:
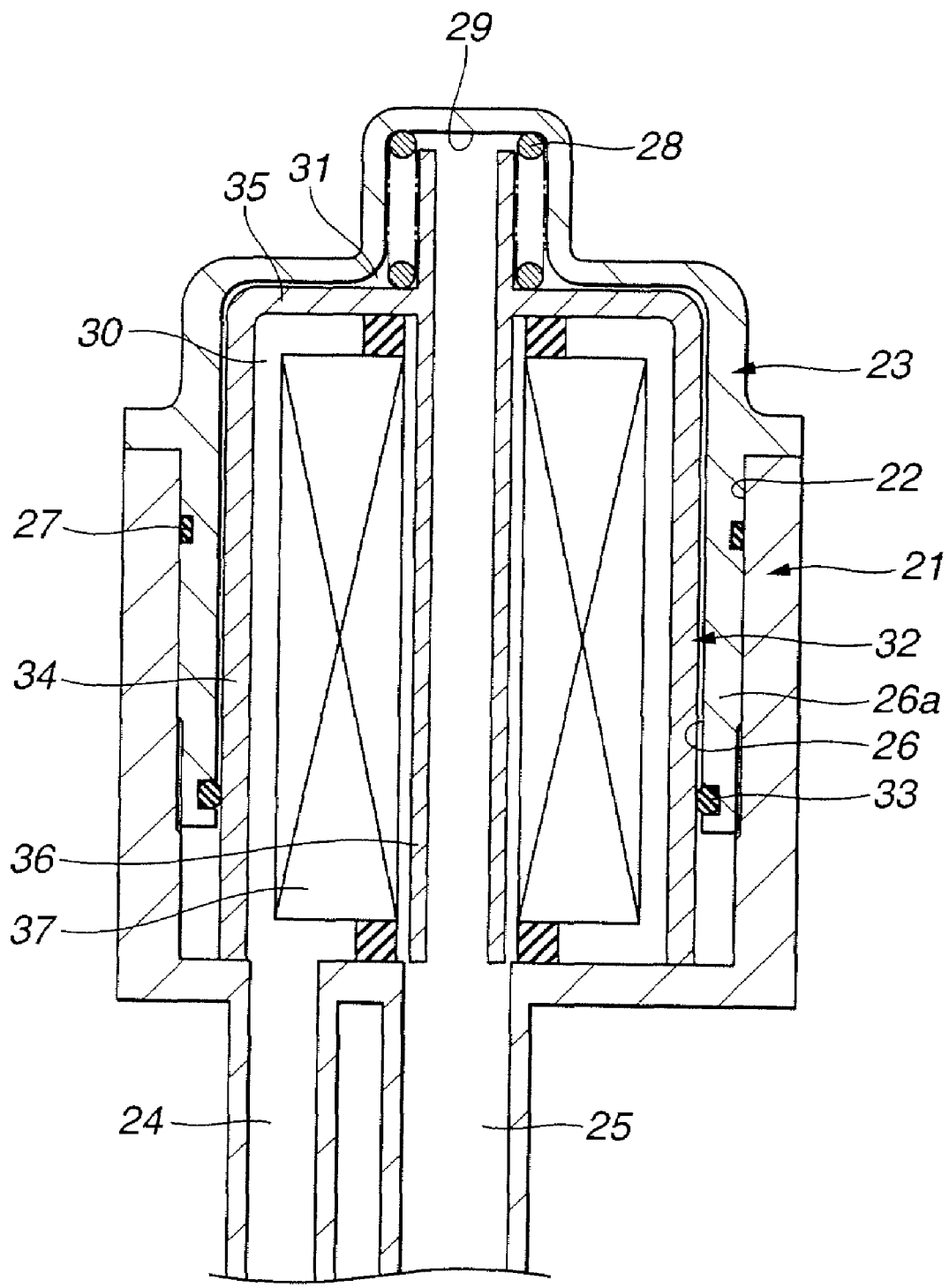
FIG. 4 is a sectional view of an oil filter according to a second embodiment of the present invention.
Figure 5:
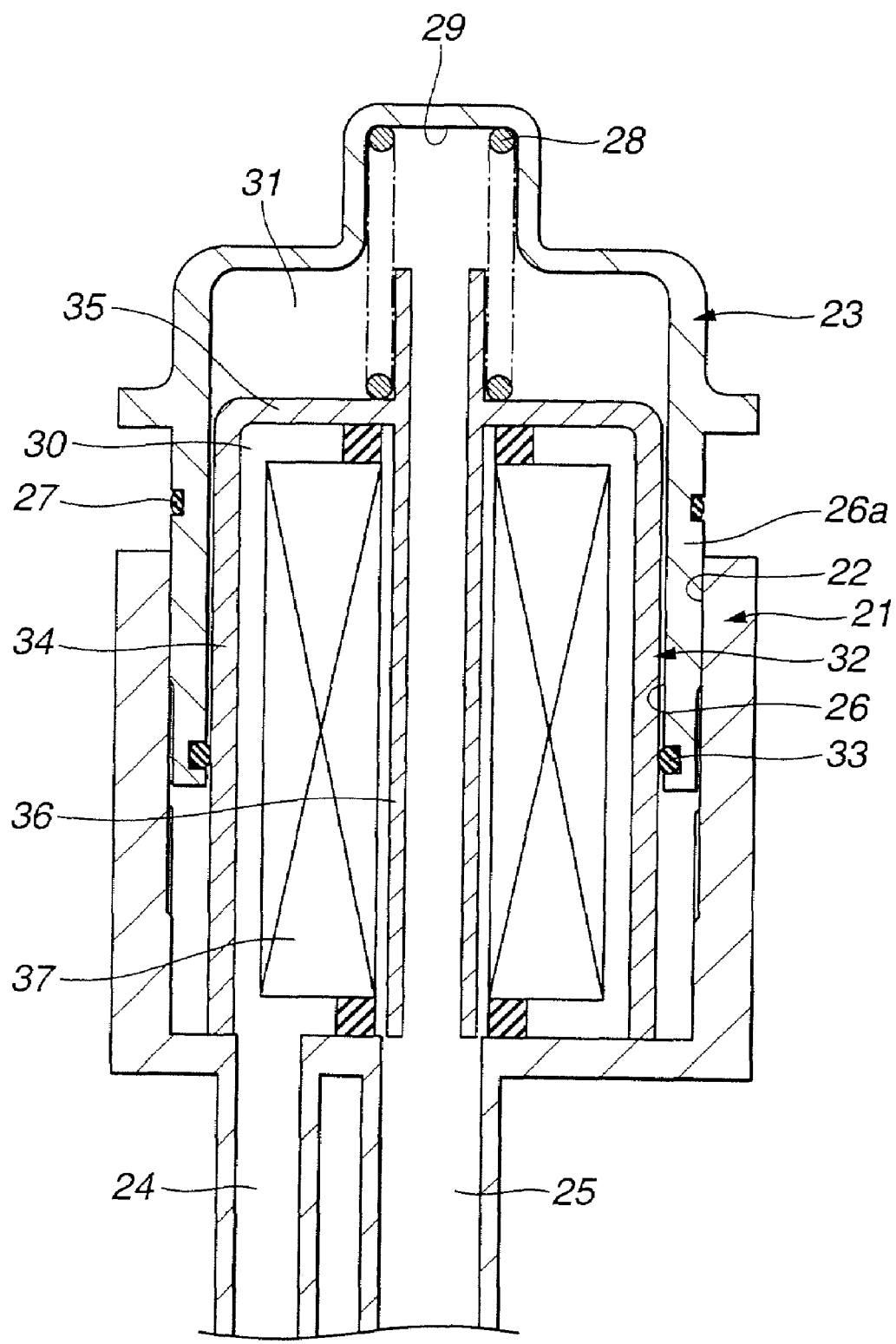
FIG. 5 is a sectional view of the oil filter of FIG. 4, in a state of a cover being partly removed.

FIGS. 4 and 5 show an oil filter according to a second embodiment of the present invention. In this embodiment, a housing main body 21 is fixedly attached to an internal combustion engine (not shown) or the like so as to allow an opening portion 22 to face and open vertically upward, and a cover 23 is detachably attached to an opening portion 22 of a housing main body 21 on the upper side thereof. The housing main body 21 is similar in structure to that of the first embodiment and has at a bottom surface side thereof an inlet passage 24 and an outlet passage 25.

A cover 23 has a recessed portion 26 associated with the opening portion 22 of the housing main body 21, and a circumferential wall 26*a* of the recessed portion 26 is threadedly engaged with an inner circumferential side of the opening portion 22. Attached to the outer surface of the circumferential wall 26*a* of the recessed portion 26 at a position more outward than the threaded engagement portion is a seal member 27 by which a seal is provided between the recessed portion 26 of the cover 23 and the opening portion 22 of the housing main body 21. Further, to the bottom surface of the recessed portion 26 is provided a depression 29 of a circular cross section. The depression 29 receives therewithin a coil spring 28 that will be described later.

Further, disposed in the recessed portion 26 of the cover 23 so as to be movable axially relative thereto or movable into and out of the recessed portion 26 is a partition member 32 that partitions the space between the cover 23 and the housing main body 21 into two chambers, i.e., a filter chamber 30 on the housing main body 21 side and an oil suction chamber 31 on the cover 23 bottom side. To the inner circumferential surface of the recessed portion 26 is provided a seal member 33 that provides a seal between the recessed portion 26 and the partition member 32.

The partition member 32 has an outer circumferential wall 34 and a bottom wall 35 closing an upper end portion of the outer circumferential wall 34. At the central portion of the bottom wall 36 is provided an integral tubular portion 36 that extends vertically through the bottom wall 36. The tubular portion 36 constitutes a passage for providing communication between the filter chamber 30 and the oil suction chamber 31. The tubular portion 36 extends downward from the bottom wall 35 and through the inner circumferential portion of the filter element 37 so as to have a lower end positioned adjacent the bottom surface of the housing main body 21. The tubular portion 36 extends upward from the bottom wall 35 so as to have an upper end positioned inside the depression 29 of the cover 23. Between the bottom surface of the depression 29 and the bottom wall 35 of the partition member 32 is disposed a coil spring 28 that serves as a biasing means or unit. The coil spring 28 urges the partition member 32 in the direction to increase the volume of the oil suction chamber 31. In the meantime, the upper protruded section of the tubular portion 36 also serves as a guide of the coil spring 28.

In the meantime, the volume of the oil suction chamber 31 when the partition member 32 protrudes maximumly from the cover 23 is set larger than the volume of oil remaining inside the housing main body 21 at the time of replacement of the filter element 37.

In use of the filter, as shown in FIG. 4, the partition member 32 and the filter element 37 are fixedly held inside the housing main body 21 by threadedly engaging the cover 23 with the opening portion 22 of the housing main body 21 under the condition where the filter element 37 is disposed in place around the tubular portion 36 of the partition member 32. Namely, at this time, the coil spring 28 is compressed to allow the lower end of the partition member 23 to be pressed against the bottom surface of the housing main body 21 while holding the filter element 37 between the partition member 32 and the bottom surface of the housing main body 21. Accordingly, at this time, the partition member 32 is pushed into the recessed portion 26 of the cover 23 and held thereat against the bias of the coil spring 28.

For replacement of the filter element, the cover 23 is loosened so as to move little by little out of the opening portion 22 of the housing main body 21 as shown in sequence in FIGS. 4 and 5. At this time, the coil spring 28 becomes longer while holding the lower end of the partition member 32 pressed against the bottom surface of the housing main body 21, thus causing the oil suction chamber 31 between the cover 23 and the partition member 32 to increase in volume gradually. The increase in volume causes vacuum pressure inside the oil suction chamber 31, thus causing the oil remaining inside the housing main body 21 to be sucked into the oil suction chamber 31 through the tubular portion 36.

Herein, the lower end of the tubular portion 36 of the partition member 32 is positioned adjacent the bottom surface of the opening portion 22 of the housing main body 21 while the partition member 32 is biased by the coil spring 28. Furthermore, since the volume of the oil suction chamber 31 at the time of maximum protrusion of the partition member 32 from the housing main body 21 is set larger than the volume of the remaining oil, almost all of the oil remaining inside the housing main body 21 is sucked into the oil suction chamber 31 when the cover 23 is pulled completely out of the housing main body 21. Under this condition, the filter element 37 is removed from the cover 23 or housing main body 21.

Further, after the remaining oil is sucked into the oil suction chamber 31, the cover 23 is turned upside down while being held above a predetermined oil recovery vessel and the partition member 32 is pushed into the recessed portion 26 thereby causing the oil inside the oil suction chamber 31 to flow out of the same into the oil recovery vessel.

Accordingly, in the oil filter, the oil remaining inside the housing main body 21 can be drained off completely and the oil collected inside the oil suction chamber 31 can be discharged into the oil recovery vessel with ease and assuredness, thus making it possible to prevent oil from being scattered to the outside at the time of replacement of the filter element assuredly.

In the meantime, the fastening of the cover 23 to the housing main body 21 is not limited to a thread fastening means but can be another fastening means. However, when the thread fastening is employed as in this embodiment, the volume of the oil suction chamber 31 can be increased gradually and slowly, thus not incurring such a case where air is sucked into the oil suction chamber 31 at the beginning of stroke of the partition member 32 and making it possible to suck the oil remaining inside the housing main body 21 into the oil suction chamber 31 assuredly.

Figure 6:
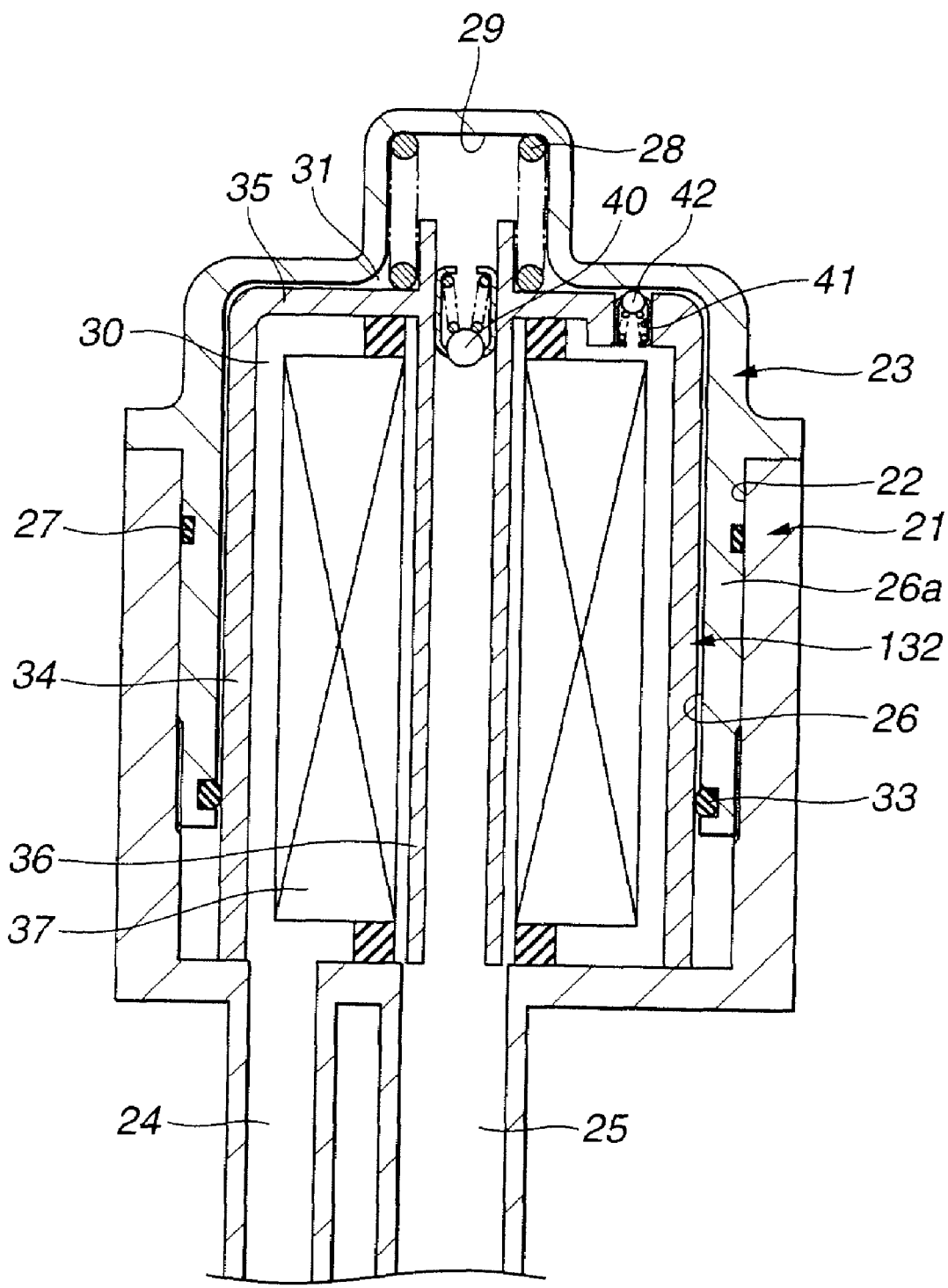
FIG. 6 is a sectional view of an oil filter according to a third embodiment of the present invention.
Figure 7:
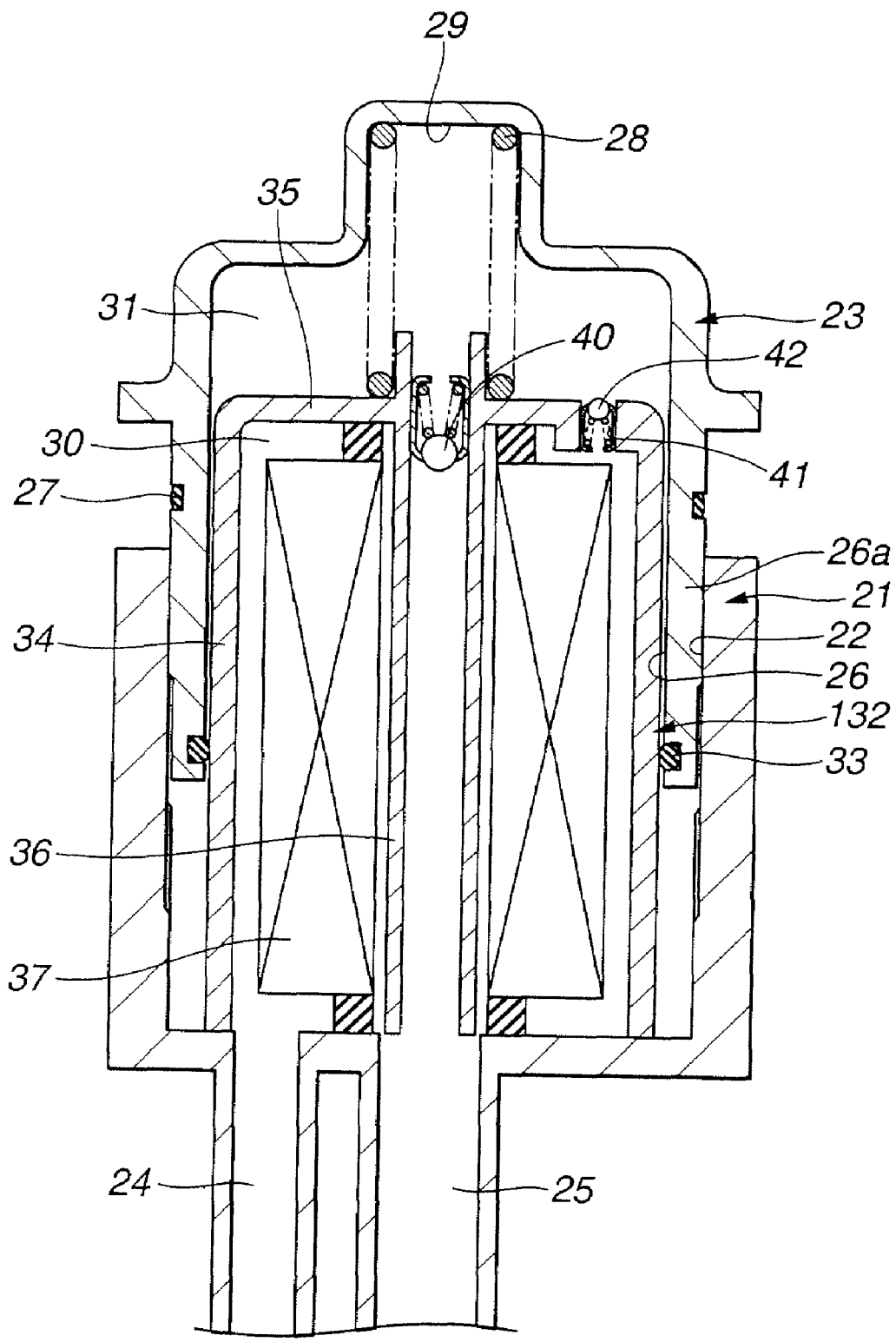
FIG. 7 is a sectional view of the oil filter of FIG. 6, in a state of a cover being partly removed.

FIGS. 6 and 7 show an oil filter according to a third embodiment of the present invention. This embodiment is substantially the same as the second embodiment except for the structure of the partition member. Thus, like portions to the second embodiment are designated by like reference characters and repeated description thereto is omitted for brevity.

A partition member 132 includes, similarly to the second embodiment, an outer circumferential wall 34, bottom wall 35 and tubular portion 36. Within the tubular portion 36 is disposed a first check valve 40 that opens only when the volume of the oil suction chamber 31 increases. To the bottom wall 35 is provided a drain passage for providing communication between the oil suction chamber 31 and the filter chamber 30. Within the drain passage 41 is disposed a second check valve 42 that opens only when the volume of the oil suction chamber 31 decreases.

In the oil filter described above, when the cover 23 is loosened for replacement of the filter element 37 and the volume of the oil suction chamber 31 is increased, the first check valve 40 opens the passage inside the tubular portion 36 to allow the oil remaining inside the housing main body 21 to be sucked into the oil suction chamber 31. When the coil spring 28 is elongated or lengthened maximumly to stop increase in the volume of the oil suction chamber 31, the first check valve 40 closes the passage inside the tubular portion 36 again. Accordingly, after this time, there is not caused any disadvantage that the oil inside the oil suction chamber 31 flows out to the outside through the tubular portion 36 during the time when the cover 23 is removed completely from the housing main body 21 and the cover 23 is transferred to the oil recovery vessel.

Further, for draining oil inside the oil suction chamber 31, the cover 23 is turned upside down and the partition member 32 is pushed down into the recessed portion 26 of the cover 23. By pushing down the partition member 32 in this manner, the pressure inside the oil suction chamber 31 becomes higher to cause the second check valve 42 to open the drain passage 41, thus allowing the oil inside the oil suction chamber 31 to be discharged through the drain passage 41 to the outside. Accordingly, by manual operation similar to that of the second embodiment, the oil can be drained off quite easily.

In the meantime, the second check valve 42 is an embodiment of an oil draining means for allowing the oil suction chamber 31 to open to the outside upon drainage of oil and various modified embodiments can be employed in place thereof, for example, the drain passage 41 may be provided with a detachable cover or a valve mechanism that opens and closes based upon a compressive variation of the coil spring 28.

Figure 8:
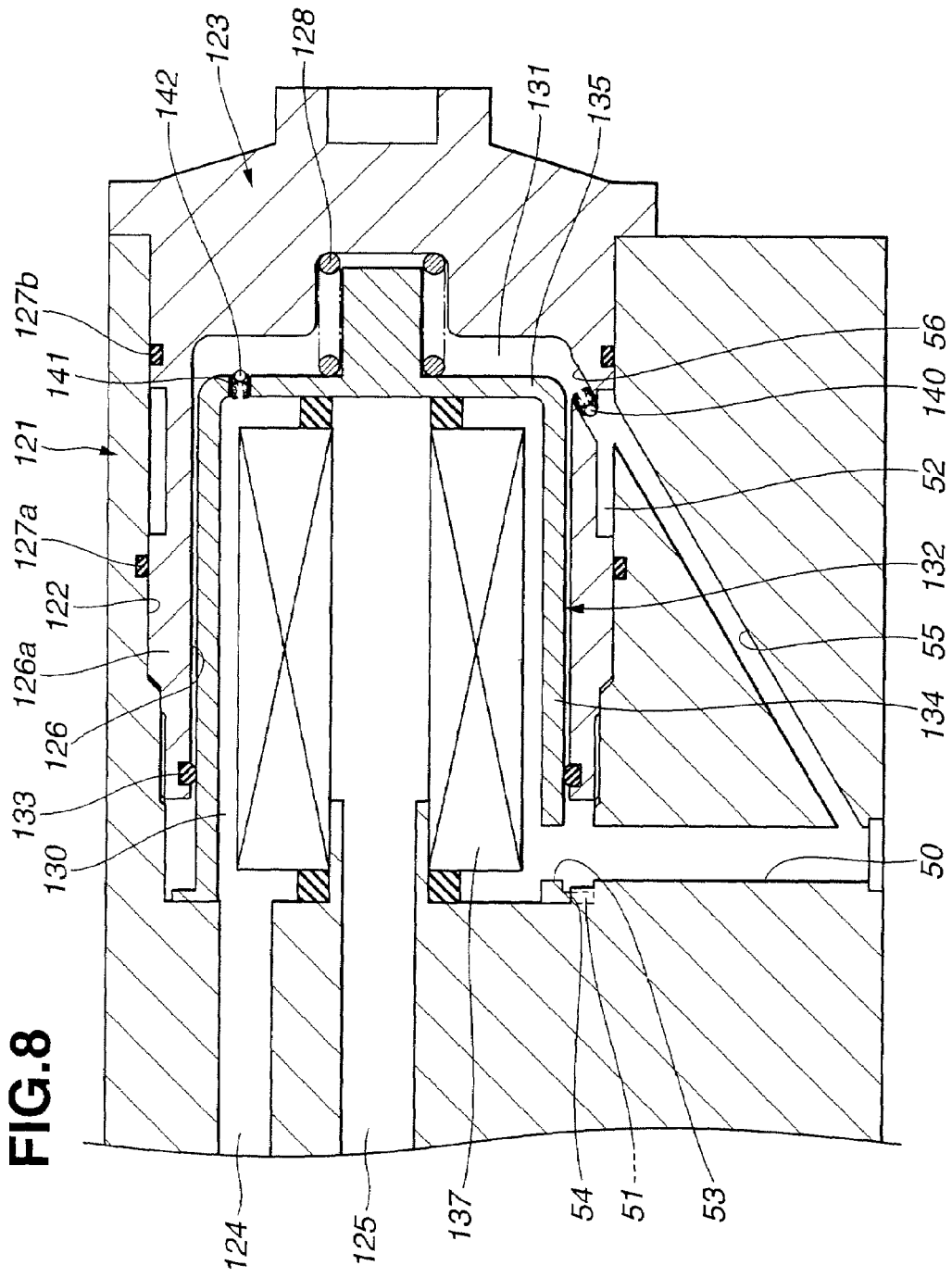
FIG. 8 is a sectional view of an oil filter according to a fourth embodiment of the present invention.
Figure 9:
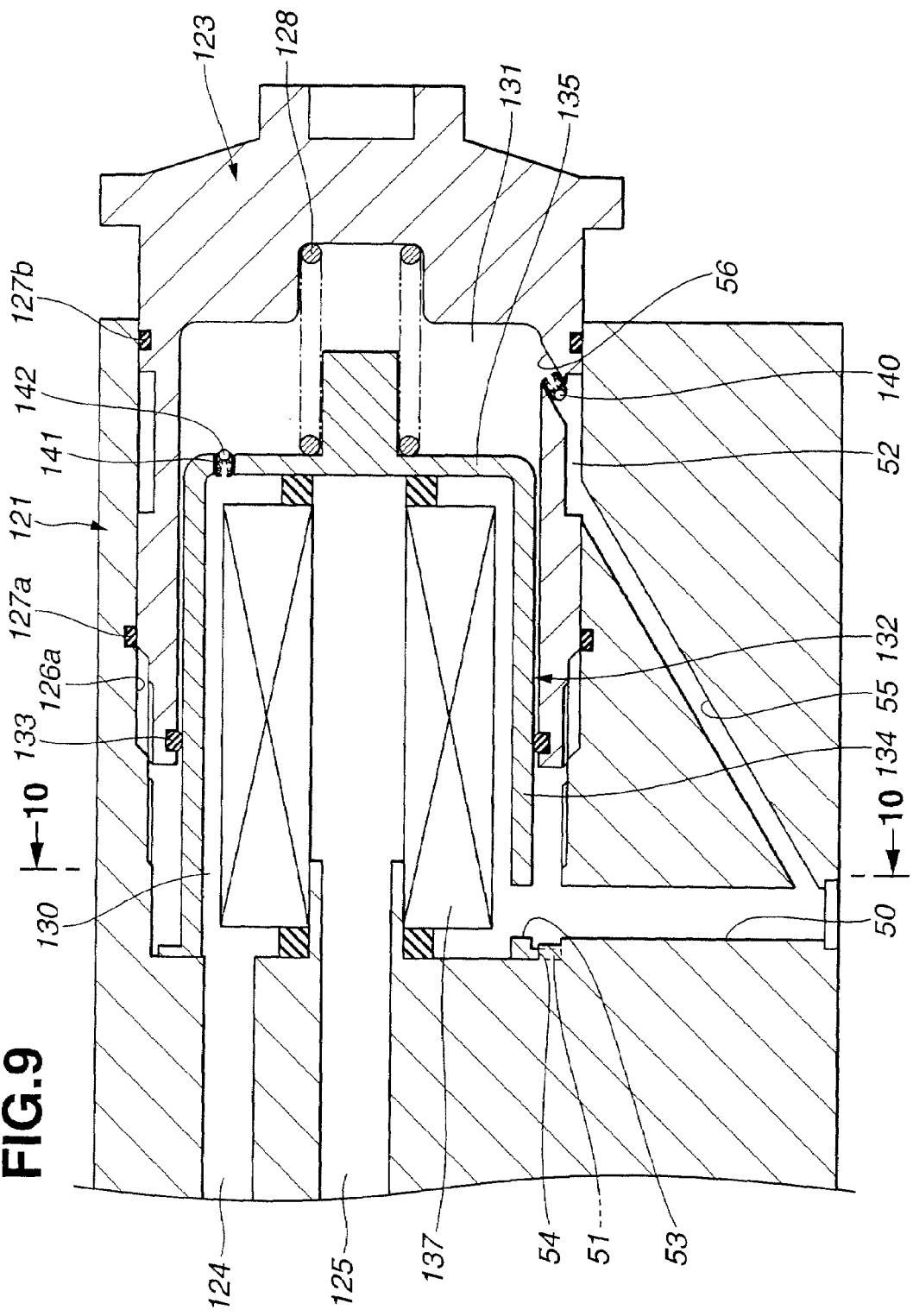
FIG. 9 is a sectional view of the oil filter of FIG. 8, in a state of a cover being partly removed.
Figure 10:
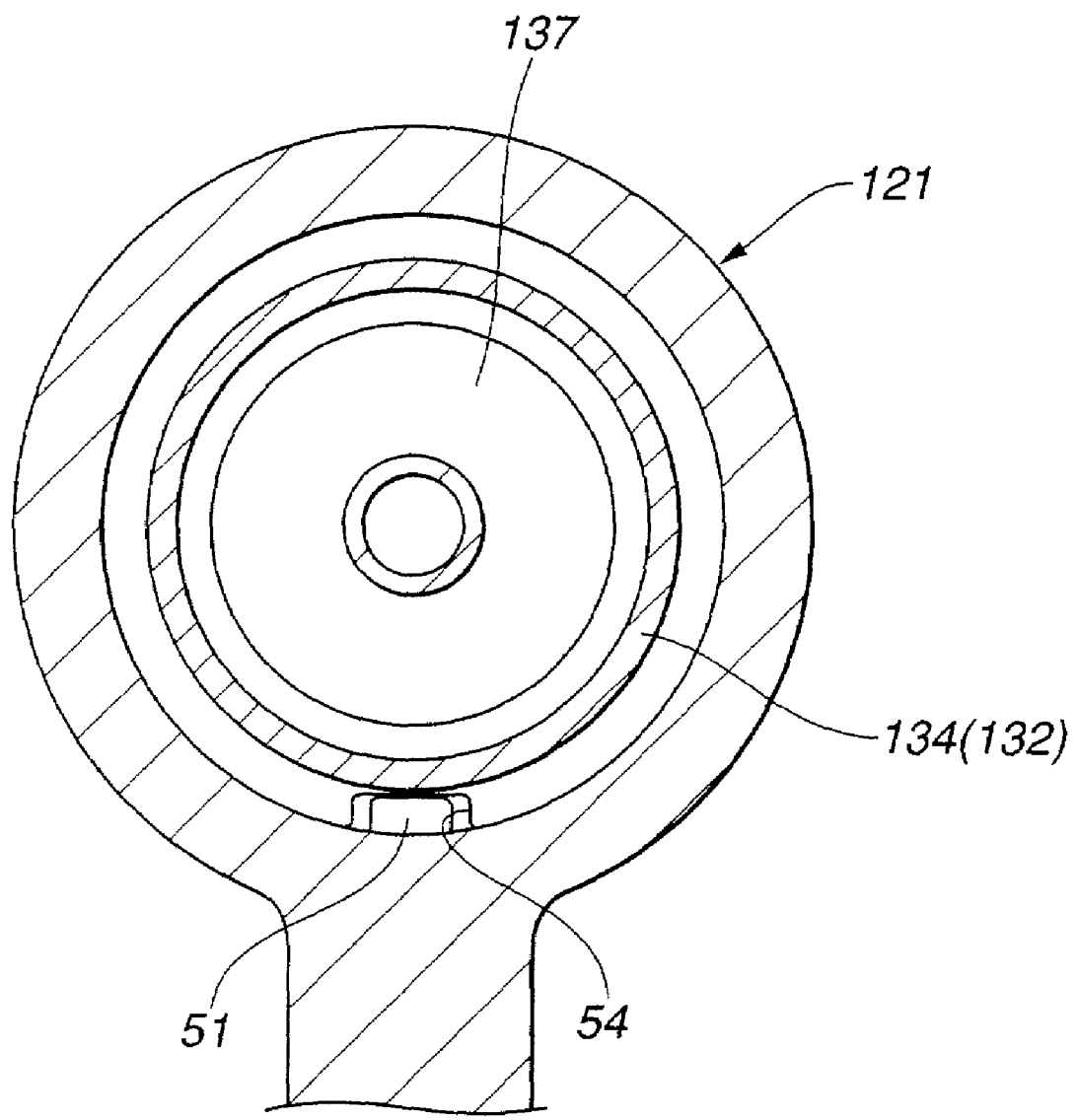
FIG. 10 is a sectional view taken along the line 10-10 in FIG. 9.

FIGS. 8 to 10 show an oil filter according to the fourth embodiment of the present invention. In this embodiment, a housing main body 121 is fixedly attached to an internal combustion engine or the like in such a manner as to allow an opening portion 122 to face or open nearly in the horizontal direction and a cover 123 is detachably attached to the opening portion 122 on a nearly horizontal side of the housing main body 121.

To a bottom wall of the opening portion 122 of the housing main body 121 are provided an inlet passage 124 and an outlet passage 125. Provided to a peripheral wall of the opening portion 122 at a location adjacent the bottom wall and at a vertically lowermost position is provided an oil drawing hole 50. The oil drawing hole 50 extends vertically downward from the peripheral wall of the opening portion 122 so as to have a bottom portion at a lowermost position of the housing main body 121. Further, to the bottom wall of the opening portion 122 is provided a positioning projection 51 with which a partition member 132 that will be described later is engaged.

On the other hand, the cover 123 has a recessed portion 126 associated with the opening portion 122 of the housing main body 121. An outer circumferential wall 126a of the recessed portion 126 is threadedly engaged with an inner circumferential side of the opening portion 122 of the housing main body 121. Formed in the circumferential wall 126a of the cover 123 at a location nearer to a base portion side (i.e., outer end side) than the threaded engagement portion and on the outer circumferential side an annular groove that cooperates with the opening portion inner surface of the housing main body 121 to define an annular passage 52. At the positions opposed axially of the annular passage 52 are provided a pair of sealing members 127a, 127b that provide a seal between the opening portion 122 and the recessed portion 126.

In the recessed portion 126 of the cover 123 is disposed a partition member 132 having a bottomed hollow, cylindrical shape nearly the same as those of the second and third embodiments in a way as to be axially movable into or out of the recessed portion 126. The partition member 132 has a bottom wall 135 that partitions the space between the housing main body 121 and the cover 123 into a filter chamber 130 and an oil suction chamber 131. Between the bottom wall 135 of the partition member 132 and the bottom surface of the recessed portion 126 of the cover 123 is disposed a coil spring 128 that serves as a biasing means. The coil spring 128 urges the partition member 132 and the cover 123 in the direction to increase the volume of the oil suction chamber 131. Further, between the housing main body 121 and the bottom wall 135 of the partition member 132 is held a filter element 137. In the meantime, indicated by 141 is a drain passage for providing communication between the oil suction chamber 131 and the filter chamber 130 and by 142 is a second check valve that opens the drain passage 141 only when the volume of the oil suction chamber 131 decreases.

The outer circumferential wall 134 of the partition member 132 has adjacent a leading end thereof an oil circulating hole 53 that allows oil to flow therethrough from the inside of the outer circumferential wall 134 to the outside. The oil circulating hole 53 is provided for drawing the oil remaining inside the partition member 132 into the oil drawing hole 50 of the housing main body 121 and is disposed at the vertically lowermost position of the outer circumferential wall 134. However, the position of the oil circulating hole 53 varies when the partition member 132 rotates relative to the housing main body 121. Thus, the outer circumferential wall 134 of the partition member 132 has at the leading end portion thereof a positioning notch 54 that is engaged with the positioning projection 51 on the housing main body 121 side, thereby fixing the position of the oil circulating hole 53 relative to the housing main body 121.

Herein, under the condition where the cover 123 is threadedly engaged with the housing main body 121, the housing main body 121 is formed with a first communication passage 55 that provides communication between the bottom portion of the oil drawing hole 50 and the annular passage 52. The first communication passage 55 is formed so as to slant from the annular passage 52 downwardly toward the bottom portion side of the communication passage 56. Further, the cover 123 is formed with a second communication passage 56 that provides communication between the annular passage 52 and the oil suction chamber 131. In the second communication passage 56 is disposed a first check valve 140 that opens only when the volume of the oil suction chamber 131 increases.

In use of the oil filter, the filter element 137 is disposed between the housing main body 121 and the bottom wall of the partition member 132 and the cover 123 is threadedly engaged with the housing main body 121 under the condition where the positioning notch 54 is engaged with the positioning projection 51. By such threaded engagement of the cover 123, the coil spring 128 is compressed while holding the leading end portion of the partition member 132 to be abuttingly engaged with the bottom portion of the housing main body 121. Accordingly, under the condition where the cover 123 is threadedly engaged with the housing main body 121, the cover 123 is pushed down into the recessed portion 54 of the housing main body 121 against the bias of the coil spring 128.

Upon replacement of the filter element 137, as the cover 123 is loosened increasingly, it moves away from or out of the recessed potion 54 of the housing main body 121 while holding the partition member 132 to be pressed against the bottom portion of the housing main body 121 by means of the coil spring 128, thus causing the volume of the oil suction chamber 131 to increase gradually. Such increase in volume of the oil suction chamber 131 causes a negative pressure to be developed in the oil suction chamber 131, thus causing the first check valve 140 to open the communication passage 56 and allowing oil remaining at the bottom portion of the oil drawing hole 50 to be sucked into the oil suction chamber 131 through the first communication passage 55 and the annular passage 52.

At this time, since the communication passage 56 has an open end at the outer circumferential surface of the cover 123, rotation of the cover 123 causes the position of the open end to vary relative to the housing main body 121. However, since the second communication passage 56 is communicated with the communication passage 55 through the annular passage 52, oil can be sucked from the bottom portion of the oil drawing hole 50 into the oil suction chamber 131 continuously during unfastening or loosening of the cover 123. Since the oil drawing hole 50 is provided at the lowermost position of the housing main body 121, the oil remaining inside the housing main body 121 can be sucked into the oil suction chamber 131 almost completely.

When increase in the volume of the oil suction chamber 131 is finished in this manner, the first check valve 140 is closed, so that when the cover 123 is removed from the housing main body 121, the second communication passage 56 is in a condition of being completely closed. Accordingly, transferring the cover 123 to a recovery vessel while holding it in a state of being removed as above does not cause any anxiety or fear that oil leaks from the oil suction chamber 131. Further, while a little amount of oil may remain in the opening portion 122 of the housing main body 121 and in the first communication passage 55 after removal of the cover 123 from the housing main body 121, the remaining oil does not leak to the outside of the housing main body 121 but returned to the oil drawing hole 50 since the first communication passage 55 slants toward the bottom portion of the oil drawing hole 50.

Further, for discarding oil after removal of the cover 123, the partition member 132 is pushed down into the cover 123 thereby causing the second check valve 142 to open and allowing the oil inside the oil suction chamber 132 to be drained off through the drain passage 141 into the recovery vessel.

Accordingly, in case of this embodiment, the filter 137 can be replaced by new one by discarding the oil remaining inside the housing main body 121 without being scattered to the outside.

From the foregoing, it will be understood that according to an aspect of the present invention, loosening the cover and thereby moving the same vertically downward of the housing main body for removal of the cover from the housing main body, causes the inner tubular member to protrude from the recessed portion of the cover under the bias of the biasing unit, thus increasing the oil collecting space by the amount corresponding to the amount of protrusion of the inner tubular member. Thus, the oil remaining in the space between the housing main body and the cover is collected in the oil collecting space on the cover side without leaking to the outside. Accordingly, according to the present invention, the oil remaining inside the oil filter can be discarded with ease and assuredness, without being scattered to the outside.

It will be further understood that according to another aspect of the present invention, moving the cover away from the housing main body for removal of the cover from the housing main body, causes the partition member to displace under the bias of the biasing means so as to increase the volume of the oil suction chamber. By this, vacuum pressure is developed in the oil suction chamber, thus causing the oil remaining inside the filter chamber to be sucked into the oil suction chamber through the communication passage. Accordingly, by this aspect of the present invention, the remaining oil can be discarded with ease and assuredness without being scattered to the outside. Furthermore, since the remaining oil is sucked into the oil suction chamber by the negative pressure developed therein, the similar effect described above can be attained even if the cover is adapted to be removed in any other direction.

It will be further understood that since the communication hole is closed by the check valve at any time other than the time oil is sucked into the oil suction chamber, the oil once sucked into the oil suction chamber does not leak to the outside during the work for removal of the cover, etc.

It will be further understood that according to the present invention, the total volume of the cover and the inner tubular member when the inner tubular member protrudes maximumly from the cover is set larger than the volume of oil remaining in the space between the housing main body and the cover upon removal of the cover. Thus, upon removal of the cover, the remaining oil can be collected in the oil collecting space that is formed by protrusion of the inner tubular member from the cover without overflowing and scattering of the remaining oil to the outside can be prevented more assuredly.

It will be further understood that according to the present invention, the volume of the oil suction chamber when the partition member is displaced maximumly toward the open end side of the recessed potion of the cover is set larger than the volume of oil remaining in the space between the housing main body and the cover upon removal of the cover. Thus, upon removal of the cover, the remaining oil can be collected completely in the oil suction chamber and therefore can be prevented from being scattered to the outside more assuredly.

It will be further understood that according to the present invention, the filter element is detachably attached to the inner tubular member or the partition member. Thus, upon removal of the cover, the filter element can be removed from the housing main body together with the inner tubular member or the partition member, thus making it easier the work for removal of the filter element.

It will be further understood that according to the present invention, in the oil filter in which removal of the cover is performed on the vertically lower side of the housing main body, the oil collecting portion is formed at the bottom side outer circumferential periphery of the cover. Thus, upon removal of the cover from the housing main body, the remaining oil dropping from the inner circumferential surface of the opening portion of the housing main body and from the outer circumferential wall upper part of the cover can be collected in the oil collecting portion, thus making it possible to prevent scattering of oil to the outside more assuredly.

It will be further understood that according to the present invention the cover is threadedly engaged with the housing main body. Thus, upon removal of the cover from the housing main body, the cover can be separated and moved away from the housing main body gradually by being loosened, thus making it possible to prevent scattering of the remaining oil due to rapid springback of the biasing unit.

According to the further aspect of the present invention, the oil draining device for allowing the oil suction chamber to open to the outside arbitrarily is provided. Thus, after the cover is removed from the housing main body with the remaining oil being collected in the oil suction chamber, the oil collected in the oil suction chamber can be drained into a predetermined place by making the oil suction chamber be opened to the outside by means of the oil draining means.

It will be further understood that according to the present invention the oil draining device comprises a valve mechanism that opens when the oil suction chamber is subjected to a force and thereby urged to decrease in volume. Thus, when the partition member is pushed down or the like operation is made for subjecting the oil suction chamber to a force that urges the oil suction chamber to decrease in volume after the cover is removed from the housing main body, the valve mechanism opens the oil suction chamber, thus enabling the oil inside the oil suction chamber to be drained off with ease.

It will be further understood that according to the present invention the valve mechanism is constituted by a check valve. Thus, with a quite simple structure, the oil suction chamber can be opened assuredly only when the pressure inside the oil suction chamber is made higher by pushing down the partition member or the like operation.

It will be further understood that according to the present invention a seal member that provides a seal between the cover and the housing main body is provided. Thus, by the seal member, leakage of oil through the space between the cover and the housing main body can be prevented. Furthermore, since the seal member is provided on the cover side, the seal member can be replaced under the condition where the cover is removed from the housing main body.

It will be further understood that according to the present invention the inner tubular member has the partition wall closing an end of the tubular wall and at least one of the tubular wall and the partition wall of the inner tubular member is provided with a communication hole for providing communication between the oil collecting chambers above and under the inner tubular member. Thus, upon removal of the cover, the oil remaining inside the inner tubular member can be made to flow into the lower oil collecting space, and furthermore the lower oil collecting space is closed by the partition wall, thus making it difficult for the oil inside the oil collecting chamber to flow out therefrom upon removal of the cover from the housing main body.

It will be further understood that according to the present invention the volume of the oil collecting space on the lower side of the partition wall of the inner tubular member when the inner tubular member projects maximumly from the cover is set larger than the volume of oil remaining in the space between the housing main body and the cover upon removal of the cover. Thus, when the cover is removed completely from the housing main body and therefore the inner tubular member is in a state of protruding maximumly from the cover, the remaining oil is completely collected in the oil collecting space on the lower side of the partition wall, thus making it possible to prevent scattering of oil to the outside more assuredly.

It will be further understood that according to the present invention the communication hole is formed in the inner tubular member at the position thereof corresponding to the lowermost position of the oil suction chamber that is defined between the partition wall and the recessed portion of the cover when the recessed portion of the cover is turned so as to open or face vertically downward. Thus, when the cover is removed from the housing main body and then turned upside down thereby allowing the recessed portion to open or face vertically downward for discarding the oil, the oil inside the oil collecting space is drained off through the oil communication passage that is placed at the lowermost position of the oil collecting chamber. Due to this, the oil inside the oil collecting chamber can be drained off completely without allowing any oil to remain inside the oil collecting chamber.

It will be further understood that according to the present invention, the end of the communication passage in communication with the oil suction chamber is positioned so as to open assuredly into the oil remaining inside the space between the cover and the housing main body upon removal of the cover. Thus, upon removal of the cover, the remaining oil can be suctioned assuredly into the oil suction chamber.

It will be further understood that according to the present invention, in the oil filter having the housing main body and the cover threadedly engaged with the housing main body, the annular chamber is formed between the opening portion of the housing main body and the outer circumferential surface of the cover, the first connecting passage is formed in the housing main body to provide communication between the lower portion of the housing main body at which oil remains and the annular passage, and the second connecting passage formed in the cover for providing communication between the annular passage and the oil suction chamber. Thus, even when the cover is turned for loosening to vary the position of the open end of the second connecting passage, it becomes possible to maintain communication between the lower place inside the housing main body and the oil suction chamber irrespective of a variation of the position of the open end of the second connecting passage. Accordingly, before the cover is removed completely from the housing main body, the oil remaining in the lower place inside the housing main body can be sucked completely into the oil suction chamber and therefore scattering of the remaining oil to the outside can be prevented completely.

It will be further understood that according to the present invention, the check valve that opens when the oil suction chamber increases in volume is disposed in the second connecting passage. Thus, a disadvantage that the oil having been once sucked into the oil suction chamber flows out to the outside through the second connecting passage after removal of the cover.

It will be further understood that according to the present invention the second connecting passage connected at one of opposite ends to the annular passage extends therefrom vertically downward toward the other of the opposite ends or extends therefrom so as to slant downward toward the other of the opposite ends. Thus, there never occurs such a case in which the oil remaining inside the first connecting passage after removal of the cover form the housing main body flows out of the opening portion to the outside but the oil adhering the opening portion can be returned to the first connecting passage side by the gravity of oil. Accordingly, dropping of oil from the housing main body 121 can be prevented assuredly.

The entire contents of Japanese Patent Application P2002-232250 (filed Aug. 9, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

The scope of the invention is defined with reference to the following claims.

What is claimed is:

1. An oil filter comprising:
   a housing main body having an oil inlet passage and an outlet passage;
   a cover detachably attached to the housing main body on a vertically lower side thereof and having a recessed portion that opens toward a housing main body side;
   an inner tubular member comprising a partition wall, and being disposed in the recessed portion of the cover so as to be movable into and out of the recessed portion, an oil collecting space positioned between the partition wall and the cover;
   a seal member interposed between the inner tubular member and the cover so as to provide a seal therebetween;
   at least one communication hole in the inner tubular member communicatively coupled to the oil collecting space;
   a biasing unit for urging the inner tubular member in a direction to protrude from the recessed portion of the cover; and
   a filter element disposed within the housing main body and the cover;
   wherein when the cover is in a state of being attached to the housing main body, the inner tubular member is pushed down into the recessed portion of the cover against a bias of the biasing unit so that as the cover is being removed, the inner tubular member protrudes from the recessed portion of the cover to increase the total volume of the oil collecting space.

2. An oil filter according to claim 1, wherein the total volume of the oil collecting space when the inner tubular member protrudes maximumly from the cover is set larger than the maximum volume of oil that can remain in a space between the housing main body and the cover upon removal of the cover.

3. An oil filter according to claim 1, wherein the filter element is detachably attached to the inner tubular member.

4. An oil filter according to claim 1, wherein the cover is threadedly engaged with the housing main body.

5. An oil filter according to claim 1, wherein the inner tubular member further comprises a tubular wall, the inner tubular member partitioning an oil flowing space into upper and lower oil collecting chambers located above and below the inner tubular member, wherein the at least one communication hole is provided in at least one of the tubular wall and partition wall for providing communication between the upper and lower oil collecting chambers.

6. An oil filter according to claim 5, wherein the volume of the oil collecting space when the inner tubular member projects maximumly from the cover is set larger than the maximum volume of oil that can remain in the housing main body and the cover upon removal of the cover.

7. An oil filter according to claim 6, wherein the at least one communication hole is formed in the inner tubular member at the position thereof corresponding to the lowermost position of the lower oil collecting chamber when the cover is removed from the housing main body and turned upside down so as to allow an open end of the recessed portion of the cover to face vertically downward.

8. An oil filter comprising:
   a housing main body having an oil inlet passage and an outlet passage;
   a cover detachably attached to the housing main body on a vertically lower side thereof and having a recessed portion that opens toward a housing main body side;
   an inner tubular member comprising a partition wall, and being disposed in the recessed portion of the cover so as to be movable into and out of the recessed portion, an oil collecting space positioned between the partition wall and the cover;
   a seal member interposed between the inner tubular member and the cover so as to provide a seal therebetween;
   at least one communication hole in the inner tubular member communicatively coupled to the oil collecting space;
   a biasing unit for urging the inner tubular member in a direction to protrude from the recessed portion of the cover; and
   a filter element disposed within the housing main body and the cover;
   wherein when the cover is in a state of being attached to the housing main body, the inner tubular member is pushed down into the recessed portion of the cover against a bias of the biasing unit so that as the cover is being removed, the inner tubular member protrudes from the recessed portion of the cover to increase the total volume of the oil collecting space; and
   wherein the cover has an oil collecting portion at a bottom side outer circumferential periphery thereof.

* * * * *